United States Patent
Conyers et al.

(10) Patent No.: US 7,593,450 B2
(45) Date of Patent: *Sep. 22, 2009

(54) DYNAMIC FREQUENCY HOPPING

(75) Inventors: David J. Conyers, Minneapolis, MN (US); Jeffrey J. Cannon, St. Louis Park, MN (US); John M. Hedin, Coon Rapids, MN (US); Douglas D. Weaver, Plymouth, MN (US); Santosh K. Sonbarse, Eden Prairie, MN (US); William J. Mitchell, Eden Prairie, MN (US); Michael J. Hermel, Waseca, MN (US); Donald R. Bauman, Waseca, MN (US); Jerry E. Toms, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 484 days.

This patent is subject to a terminal disclaimer.

(21) Appl. No.: 11/095,788

(22) Filed: Mar. 31, 2005

(65) Prior Publication Data

US 2006/0222054 A1    Oct. 5, 2006

(51) Int. Cl.
*H04B 1/00* (2006.01)
(52) U.S. Cl. .................. 375/132; 375/130; 375/131; 370/319; 370/320; 370/321; 370/335; 370/342; 370/345; 370/347; 342/150; 342/151; 333/193; 333/194; 333/195
(58) Field of Classification Search .............. 375/132, 375/130, 131; 370/319, 320, 321, 335, 342; 370/345, 347; 342/150, 151; 333/193, 194, 333/195
See application file for complete search history.

(56) References Cited

U.S. PATENT DOCUMENTS

| 4,813,054 A | 1/1980 | Patisaul et al. |
| 4,569,042 A | 2/1986 | Larson |
| 4,611,323 A | 9/1986 | Hessenmuller |

(Continued)

FOREIGN PATENT DOCUMENTS

EP    0391597    10/1990

(Continued)

OTHER PUBLICATIONS

U.S. Appl. No. 11/095,628, Toms et al.

(Continued)

*Primary Examiner*—David C Payne
*Assistant Examiner*—Zewdu Kassa
(74) *Attorney, Agent, or Firm*—Fogg & Powers LLC (57) ABSTRACT

A frequency hopping communications system is disclosed. A server is adapted to have one or more radio head interface modules and a call processing software module. The call processing software module performs modulation and demodulation of voice and data streams using one or more air interface standards. A radio head unit is coupled to the radio head interface module over one or more transport mediums and communicates with one or more subscriber units using the one or more air interface standards. The one or more radio head interface modules, are adapted to receive frequency channel hopping information, including a channel and a time to hop trigger, from the call processing software module for one or more of a plurality of communication channels.

15 Claims, 7 Drawing Sheets

U.S. PATENT DOCUMENTS

| | | | |
|---|---|---|---|
| 4,628,501 A | 12/1986 | Loscoe | |
| 4,654,843 A | 3/1987 | Roza et al. | |
| 4,691,292 A | 9/1987 | Rothweiler | |
| 4,999,831 A | 3/1991 | Grace | |
| 5,184,347 A | 2/1993 | Farwell et al. | |
| 5,193,109 A | 3/1993 | Chien-Yeh Lee | |
| 5,243,598 A | 9/1993 | Lee | |
| 5,276,691 A | 1/1994 | Kivari | |
| 5,321,849 A | 6/1994 | Lemson | |
| 5,339,184 A | 8/1994 | Tang | |
| 5,544,222 A | 8/1996 | Robinson et al. | |
| 5,619,504 A | 4/1997 | Van Grinsven et al. | |
| 5,649,000 A | 7/1997 | Lee et al. | |
| 5,701,294 A | 12/1997 | Ward et al. | |
| 5,809,422 A | 9/1998 | Raleigh et al. | |
| 5,854,978 A | 12/1998 | Heidari | |
| 5,881,063 A | 3/1999 | Bement et al. | |
| 5,896,574 A | 4/1999 | Bass, Sr. | |
| 5,970,069 A | 10/1999 | Kumar et al. | |
| 5,978,688 A | 11/1999 | Mullins et al. | |
| 6,021,446 A | 2/2000 | Gentry, Jr. | |
| 6,047,002 A | 4/2000 | Hartmann et al. | |
| 6,091,765 A | 7/2000 | Pietzold, III et al. | |
| 6,097,733 A | 8/2000 | Basu et al. | |
| 6,188,898 B1 | 2/2001 | Phillips | |
| 6,219,561 B1 | 4/2001 | Raleigh | |
| 6,222,830 B1 | 4/2001 | Padovani et al. | |
| 6,233,456 B1 | 5/2001 | Schiff et al. | |
| 6,275,877 B1 | 8/2001 | Duda | |
| 6,363,421 B2 | 3/2002 | Barker et al. | |
| 6,381,289 B1 | 4/2002 | Dutta | |
| 6,434,366 B1 | 8/2002 | Harrison et al. | |
| 6,463,060 B1 | 10/2002 | Sato et al. | |
| 6,496,546 B1 | 12/2002 | Allpress et al. | |
| 6,501,785 B1 | 12/2002 | Chang et al. | |
| 6,544,428 B1 | 4/2003 | Higashi | |
| 6,584,146 B2 | 6/2003 | Bose et al. | |
| 6,633,545 B1 | 10/2003 | Milbrandt | |
| 6,636,747 B2 | 10/2003 | Harada et al. | |
| 6,715,007 B1 | 3/2004 | Williams et al. | |
| 6,728,228 B1 | 4/2004 | Ostman et al. | |
| 6,731,947 B2 | 5/2004 | Hoagland et al. | |
| 6,751,187 B2 | 6/2004 | Walton et al. | |
| 6,760,882 B1 | 7/2004 | Gesbert et al. | |
| 6,775,303 B1 | 8/2004 | Rustad et al. | |
| 6,775,305 B1 | 8/2004 | Delvaux | |
| 6,788,961 B2 | 9/2004 | Repice et al. | |
| 6,801,975 B1 | 10/2004 | Young | |
| 6,810,270 B1 | 10/2004 | Grohn et al. | |
| 6,829,229 B1* | 12/2004 | Palermo et al. | 370/347 |
| 6,876,864 B1 | 4/2005 | Chapin | |
| 6,882,851 B2* | 4/2005 | Sugar et al. | 455/454 |
| 6,889,354 B2 | 5/2005 | Feldman et al. | |
| 6,898,721 B2 | 5/2005 | Schmidt | |
| 6,912,228 B1 | 6/2005 | Dahlman et al. | |
| 6,931,074 B1* | 8/2005 | Palermo et al. | 375/259 |
| 6,944,449 B1 | 9/2005 | Gandhi et al. | |
| 6,957,086 B2 | 10/2005 | Bahl et al. | |
| 6,977,930 B1 | 12/2005 | Epps et al. | |
| 7,006,442 B1 | 2/2006 | Abe et al. | |
| 7,016,668 B2 | 3/2006 | Vaidyanathan et al. | |
| 7,035,932 B1* | 4/2006 | Dowling | 709/230 |
| 7,058,789 B2 | 6/2006 | Henderson et al. | |
| 7,069,574 B1 | 6/2006 | Adams et al. | |
| 7,072,413 B2 | 7/2006 | Walton et al. | |
| 7,099,346 B1 | 8/2006 | Kanterakis | |
| 7,099,687 B1 | 8/2006 | Makela et al. | |
| 7,103,044 B1 | 9/2006 | Keller et al. | |
| 7,116,682 B1 | 10/2006 | Waclawsky et al. | |
| 7,151,925 B2 | 12/2006 | Ting et al. | |
| 7,190,682 B2 | 3/2007 | Shepherd et al. | |
| 7,191,262 B2 | 3/2007 | Sleeman | |
| 7,203,488 B2 | 4/2007 | Luneau | |
| 7,269,200 B2 | 9/2007 | Igarashi | |
| 7,315,571 B1 | 1/2008 | Heidari et al. | |
| 7,324,786 B2 | 1/2008 | Parker | |
| 7,373,164 B2 | 5/2008 | Iacono et al. | |
| 7,386,641 B2 | 6/2008 | Xu et al. | |
| 7,398,106 B2* | 7/2008 | Conyers et al. | 455/557 |
| 7,423,988 B2* | 9/2008 | Hedin et al. | 370/322 |
| 7,424,307 B2* | 9/2008 | Hedin et al. | 455/552.1 |
| 2001/0024430 A1 | 9/2001 | Sekine et al. | |
| 2001/0031621 A1 | 10/2001 | Schmutz | |
| 2001/0037395 A1 | 11/2001 | Sabat, Jr. et al. | |
| 2002/0001337 A1* | 1/2002 | Chauncey et al. | 375/132 |
| 2002/0035633 A1 | 3/2002 | Bose et al. | |
| 2002/0056066 A1 | 5/2002 | Gesbert et al. | |
| 2002/0078247 A1 | 6/2002 | Lu et al. | |
| 2002/0093983 A1 | 7/2002 | Newberg et al. | |
| 2002/0126736 A1* | 9/2002 | Khayrallah et al. | 375/132 |
| 2002/0169894 A1 | 11/2002 | Takla | |
| 2002/0186436 A1 | 12/2002 | Mani et al. | |
| 2002/0186674 A1 | 12/2002 | Mani et al. | |
| 2002/0187809 A1 | 12/2002 | Mani et al. | |
| 2002/0191565 A1 | 12/2002 | Mani et al. | |
| 2003/0003880 A1 | 1/2003 | Ling et al. | |
| 2003/0016701 A1 | 1/2003 | Hinson | |
| 2003/0036359 A1 | 2/2003 | Dent et al. | |
| 2003/0050098 A1 | 3/2003 | D'Agati et al. | |
| 2003/0125040 A1 | 7/2003 | Walton et al. | |
| 2003/0142649 A1 | 7/2003 | Taniguchi | |
| 2004/0001429 A1 | 1/2004 | Ma et al. | |
| 2004/0005866 A1 | 1/2004 | Igarashi | |
| 2004/0033806 A1 | 2/2004 | Daniel et al. | |
| 2004/0042387 A1 | 3/2004 | Geile | |
| 2004/0046016 A1* | 3/2004 | Becker et al. | 235/380 |
| 2004/0132477 A1 | 7/2004 | Lundby et al. | |
| 2004/0156328 A1 | 8/2004 | Walton et al. | |
| 2004/0156449 A1 | 8/2004 | Bose et al. | |
| 2004/0198410 A1 | 10/2004 | Shepherd et al. | |
| 2004/0198453 A1 | 10/2004 | Cutrer et al. | |
| 2004/0209580 A1 | 10/2004 | Bose et al. | |
| 2005/0002444 A1 | 1/2005 | Wei et al. | |
| 2005/0033519 A1 | 2/2005 | Fenton | |
| 2005/0041746 A1 | 2/2005 | Rosen et al. | |
| 2005/0083876 A1 | 4/2005 | Vialen et al. | |
| 2005/0138383 A1 | 6/2005 | Vainstein | |
| 2005/0147024 A1* | 7/2005 | Jung et al. | 370/203 |
| 2005/0190855 A1 | 9/2005 | Jin et al. | |
| 2005/0280564 A1* | 12/2005 | Lee | 341/61 |
| 2006/0015674 A1* | 1/2006 | Murotake | 711/101 |
| 2006/0034242 A1 | 2/2006 | Proctor, Jr. | |
| 2006/0141957 A1 | 6/2006 | Fischer et al. | |
| 2006/0206628 A1 | 9/2006 | Erez | |
| 2006/0222054 A1 | 10/2006 | Conyers et al. | |
| 2006/0227736 A1 | 10/2006 | Conyers et al. | |
| 2007/0032241 A1 | 2/2007 | Busch et al. | |
| 2008/0025211 A1 | 1/2008 | Karaoguz et al. | |
| 2008/0137575 A1 | 6/2008 | Conyers et al. | |
| 2008/0168199 A1 | 7/2008 | Conyers et al. | |
| 2008/0254784 A1 | 10/2008 | Hedin et al. | |

FOREIGN PATENT DOCUMENTS

| | | |
|---|---|---|
| EP | 0936453 | 8/1999 |
| EP | 1211817 | 6/2002 |
| WO | 9115927 | 10/1991 |
| WO | WO 01/59993 | 8/2001 |
| WO | WO 2004/047316 | 6/2004 |

OTHER PUBLICATIONS

U.S. Appl. 11/095,789, Hedin et al.
U.S. Appl. 11/094,848, Weaver et al.
U.S. Appl. 11/095,111, Hermel et al.
U.S. Appl. 11/095,112, Hedin et al.
U.S. Appl. 11/094,949, Hedin et al.
U.S. Appl. 11/095,113, Hedin et al.
U.S. Appl. 11/094,950, Hedin et al.
U.S. Appl. 11/094,947, Conyers et al.
U.S. Appl. 11/094,907, Conyers et al.
U.S. Appl. 11/095,150, Bauman et al.
U.S. Appl. 11/095,779, Hermel et al.
Harvey et al., "Cordless Communications Utilising Radio Over Fibre Techniques for the Local Loop", "IEEE International Conference on Communications", Jun. 1991, pp. 1171-1175, Publisher: IEEE.
Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
Harvey et al., "Cordless Communications Utilising Radio Over Fibre Techniques for the Local Loop", "IEEE International Conference on Communications", , pp. 1171-1175, Publisher: IEEE.

* cited by examiner

DYNAMIC FREQUENCY HOPPING

CROSS REFERENCES TO RELATED APPLICATIONS

This application is related to the following co-pending United States patent applications filed on Mar. 31, 2005, all of which are hereby incorporated herein by reference:

U.S. patent application Ser. No. 11/095,628 entitled "DYNAMIC DIGITAL UP AND DOWN CONVERTERS") and which is referred to here as the '673 application;

U.S. patent application Ser. No. 11/095,789 entitled "DYNAMIC RECONFIGURATION OF RESOURCES THROUGH PAGE HEADERS") and which is referred to here as the '675 application;

U.S. patent application Ser. No. 11/094,848 entitled "SIGNAL ENHANCEMENT THROUGH DIVERSITY") and which is referred to here as the '676 application;

U.S. patent application Ser. No. 11/095,111 entitled "SNMP MANAGEMENT IN A SOFTWARE DEFINED RADIO") and which is referred to here as the '677 application;

U.S. patent application Ser. No. 11/095,112 entitled "TIME STAMP IN THE REVERSE PATH") and which is referred to here as the '678 application;

U.S. patent application Ser. No. 11/094,949 entitled "BUFFERS HANDLING MULTIPLE PROTOCOLS") and which is referred to here as the '679 application;

U.S. patent application Ser. No. 11/095,113 entitled "TIME START IN THE FORWARD PATH") and which is referred to here as the '680 application;

U.S. patent application Ser. No. 11/094,950 entitled "LOSS OF PAGE SYNCHRONIZATION") and which is referred to here as the '681 application;

U.S. patent application Ser. No. 11/094,947, entitled "DYNAMIC REALLOCATION OF BANDWIDTH AND MODULATION PROTOCOLS" and which is referred to here as the '684 application;

U.S. patent application Ser. No. 11/094,907 100.685US01 entitled "DYNAMIC READJUSTMENT OF POWER") and which is referred to here as the '685 application;

U.S. patent application Ser. No. 11/095,150 entitled "METHODS AND SYSTEMS FOR HANDLING UNDERFLOW AND OVERFLOW IN A SOFTWARE DEFINED RADIO") and which is referred to here as the '686 application; and U.S. patent application Ser. No. 11/095,779 entitled "INTEGRATED NETWORK MANAGEMENT OF A SOFTWARE DEFINED RADIO SYSTEM") and which is referred to here as the '700 application.

TECHNICAL FIELD

The following description relates to communication systems and in particular to wireless communication systems.

BACKGROUND

Many changes are taking place in the way wireless communication networks are being deployed. Some of the changes are being driven by the adoption of new mobile communications standards. The introduction of software defined radios to wireless telecommunications has led to the generation of software and hardware solutions to meet the new standards.

A software defined radio (SDR) uses software for the modulation and demodulation of radio signals. The use of reprogrammable software allows key radio parameters, such as frequency and modulation protocols to be modified without the need to alter the underlying hardware of the system. Additionally, SDRs allow a single device to support multiple configurations which previously would have required multiple hardware devices. One example of a software defined radio is the Vanu Software Radio produced by Vanu, Inc. (See U.S. Pat. No. 6,654,428).

Current mobile communication standards introduce physical and logical channels and pose new issues in the transport of information within the communication networks. Some modulation protocols that wireless communication networks operate with include, but are not limited to, Advanced Mobile Phone System (AMPS), code division multiple access (CDMA), Wide-band CDMA (WCDMA), time division multiple access (TDMA), Global System for Mobile communications (GSM), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM).

One problem presented by these multiple standards is the expenses associated with operating and maintaining hardware dedicated to each standard. Another problem experience with dense wireless communication networks is co-channel inference. This means that phone calls are interfered with by another site operating on the same physical channel and time slot. Solutions to co-channel interference include frequency hopping that moves calls from slot to slot and frequency to frequency within a band. Frequency hopping also enhances the capacity of communications networks by allowing more calls in the same RF spectrum. Further, frequency hopping provides security against illegal call intercepts. New wireless communications standards define frequency hopping and also present algorithms for base stations to support frequency hopping in order to reduce interference.

For the reasons stated above, and for other reasons stated below that will become apparent to those skilled in the art upon reading and understanding the present specification, there is a need in the telecommunications industry for communications network systems and methods that are modulation standard independent and can support dynamic frequency hopping.

SUMMARY

The embodiments of the present invention address the problem of frequency coordination of base station components and mobile devices implementing frequency hopping protocols, as well as other problems and will be understood by reading and studying the following specification.

In one embodiment, a communications system is provided. The system comprises a server which includes one or more radio head interface modules and a call processing software module. The one or more radio head interface modules are adapted to communicate with the call processing software module. The call processing software module performs modulation and demodulation of voice and data streams using one or more air interface standards. The system further comprises a radio head unit coupled to the radio head interface module over one or more transport mediums. The radio head unit communicates with one or more subscriber units using the one or more air interface standards. The radio head interface module receives frequency channel hopping information from the call processing software module for a plurality of communication channels. The frequency channel hopping information comprises a channel and a time to hop trigger for one or more of the plurality of communication channels.

In another embodiment, a method for dynamic frequency channel hopping is provided. The method comprises receiving frequency hopping instructions indicating a RF channel to hop to and a designated trigger event and determining whether a logical channel is configured for a modulation protocol that supports frequency channel hopping. When the logical channel is configured for a modulation protocol that supports frequency hopping, the method continues with reconfiguring the logical channel to the RF channel indicated by the frequency hopping instructions upon occurrence of the designated trigger event.

In another embodiment, a computer-readable medium having computer-executable instructions for a method for dynamic frequency channel hopping is provided. The method comprises receiving frequency hopping instructions indicating a RF channel to hop to and a designated trigger event and determining whether a logical channel is configured for a modulation protocol that supports frequency channel hopping. When the logical channel is configured for a modulation protocol that supports frequency hopping, the method continues with reconfiguring the logical channel to the RF channel indicated by the frequency hopping instructions upon occurrence of the designated trigger event.

DRAWINGS

The present inventions can be more easily understood and further advantages and uses thereof more readily apparent, when considered in view of the description of the preferred embodiments and the following figures in which.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide methods and systems to implement frequency hopping in mobile communications systems. Embodiments of the present invention also minimize the possibilities of the frequency-hopping synchronization between network components from losing synchronization. Hence the need for implementing complex logic to take care of out-of-synchronization errors caused from improper frequency hopping is reduced.

Embodiments of the present invention concern portions of a cellular telecommunications network that typically comprises one or more cellular antennas, a remote unit (also called a radio head) transmitting and receiving voice and/or data communications, and a base station (also commonly called a base transceiver station (BTS), or a server) that communicates data between the remote unit and a larger communication network (e.g. the public switched telephone network, or the Internet). One or more base stations are connected to a base station controller (BSC) which controls data communication flows in one or more connected base stations.

In some embodiments, communications between a BTS and a remote unit take place through two sets of data streams. Typically, forward logical channels carry data streams from the BTS through the remote unit to an end user device. Reverse logical channels carry data streams from end user devices through the remote unit to the BTS. Each of the logical channels is assigned a radio frequency (RF) channel and a modulation protocol, which the remote unit uses to wirelessly communicate data with individual cellular devices. An end user mobile device, such as a cellular phone, sends and receives data over one forward RF channel and one reverse RF channel. In some embodiments, each RF channel is further divided into eight time slots where seven of the time slots are used to carry data with up to seven different cellular users (i.e. one cellular phone call utilizes one of the time slots for a given RF channel) and the eighth time slot is used to communicate control data between the cellular device and the BTS.

The GSM standard requires base stations to implement frequency hopping algorithms (also called channel hopping) which periodically alter the RF channel used by a logical channel in order to avoid RF channels degraded by interference. The decision as to which RF frequency to hop to is determined by industry standards.

Figure 1A:
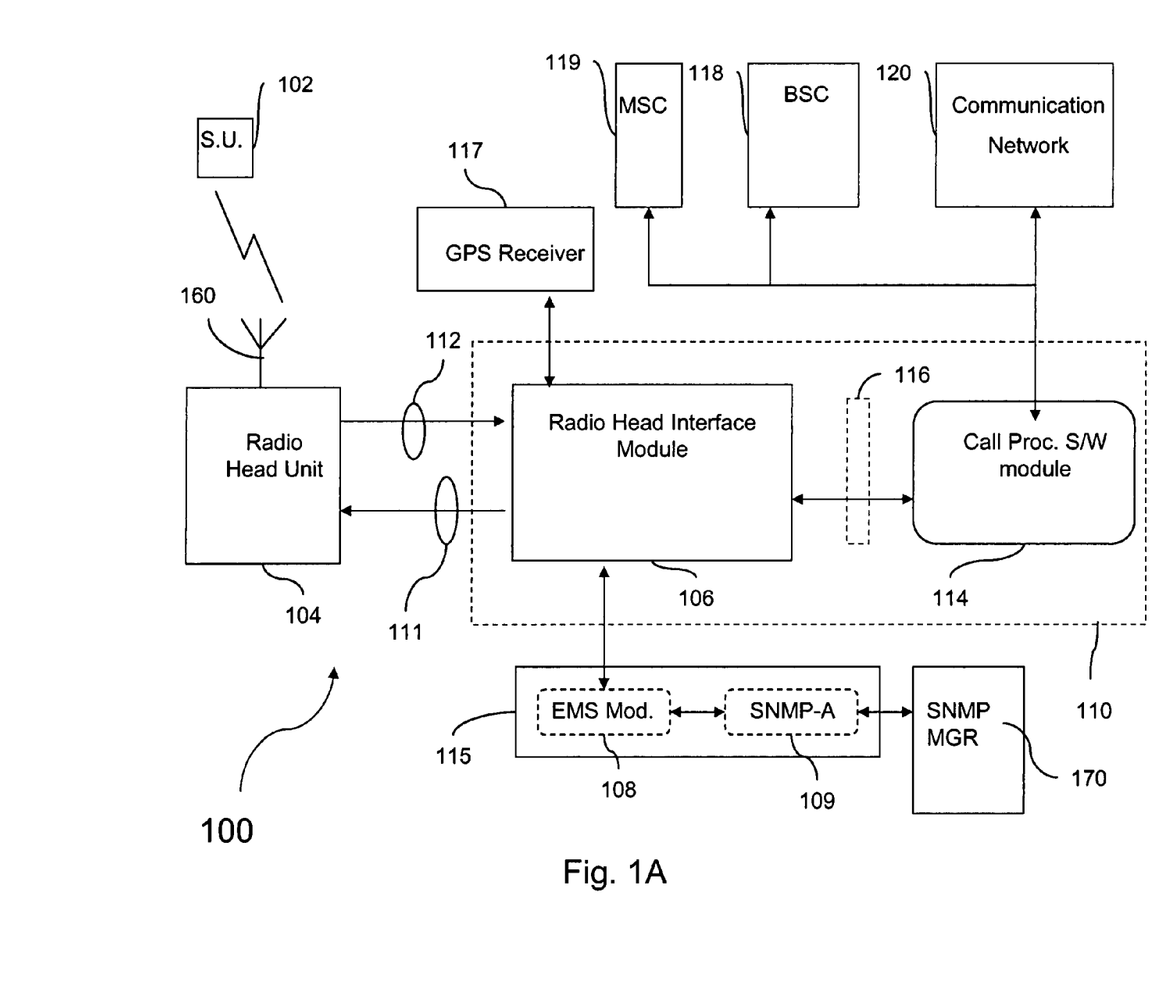
FIGS. 1A, 1B and 1C are block diagrams of a communications system of one embodiment of the present invention.

FIG. 1A provides a block diagram of one embodiment of a software defined radio communication system shown generally at 100. Communication system 100 includes one or more subscriber units 102 (or mobile devices 102) within a service area of a radio head unit 104. Radio head unit 104 is coupled to one or more servers 110 (or BTS 110) over one or more high speed transport mediums 111, and 112. Examples of high speed transport mediums include, but are not limited to, optical fiber, millimeter wave, laser through the air, coaxial, CAT 5 cabling or twisted pair wiring.

BTS 110 is connected to one or more communication networks 120 (e.g. public switched telephone network (PSTN), Internet, a cable network, or the like). In one embodiment, BTS 110 is connected to one or more communication networks through a base station controller (BSC) 118. In one embodiment, BSC 118 is a radio network controller. In another embodiment, BSC 118 is further coupled to a mobile switching center (MSC) 119. Cellular antennas 160, adapted for receiving cellular signals from one or more subscriber units 102, are coupled to radio head unit 104. In one embodiment, network 100 is a bidirectional network and as shown includes equipment for forward links (i.e. transmissions on forward logical channels from communications network 120 to mobile device 102) and reverse links (i.e. transmissions on reverse logical channels from mobile device 102 to communications network 120).

In some embodiments, additional reverse links are also provided that duplicate the reverse logical channels. This set of duplicate reverse logical channels is called diversity channels. It should be understood that descriptions in this specification relating to embodiments of reverse logical channels also apply to such diversity channels. Further details pertaining to the advantages and operation of diversity channels are provided in the '676 application incorporated herein by reference.

BTS 110 includes a call processing software module 114 (or call processing software 114) that interfaces with one or more communication networks 120. Call processing software module 114 also includes programming which implements an SDR with the BTS 110 and radio head unit 104 hardware, digitally performing waveform processing to modulate and demodulate radio signals transmitted and received, respectively, from the cellular antennas 160. In one embodiment, call processing software module 114 is a Vanu, Inc., Vanu Software Radio.

In one embodiment, BTS 110 and call processing software module 114 communicate with radio head unit 104 through a radio head interface module 106 (or radio head interface module 106). Radio head interface module 106 establishes high speed digital communication paths for two or more sets of base band data stream logical channels (i.e. forward logical channels, reverse logical channels and diversity channels) and all communication between BTS 110 and radio head unit 104 goes through radio head interface module 106. In one embodiment of the present invention, BTS 110 comprises a computer adapted with one or more cards wherein each card is a radio head interface module 106.

For a BTS 110 to ultimately communicate with mobile device 102, logical channels and the mobile device must both be set to the same RF channel. In one embodiment, call processing software module 114 determines the RF channel for frequency hopping for individual logical channels and the time to hop using a GSM standard algorithm, and passes algorithm parameters to the mobile device to enable the mobile device to determine the next RF channel in the hopping sequence. For the BTS 110 and mobile device 102 to continue communication, radio head interface module 106 must also to hop to the same frequencies at the same time as mobile device 102 and call processing software module 114. In order to hop to the same frequencies, embodiments of the present inventions require call processing software module 114 to directly tell radio head interface module 106 the hopping frequency along with the time to hop. This results in a dynamic frequency hopping mobile communication system. In one embodiment, for each logical channel two pieces of information are provided to the radio head interface card by another BTS sub-system: the RF channel to hop to, and a designated time to make the hop. In one embodiment, the designated time is based on radio head interface module 106's internal time count. When the radio head interface module 106's time count reaches the designated time, whatever data sample of that time is transmitted on the new RF channel. In another embodiment, call processing software module 114 passes a trigger data sample that designates when to do the hop, instead of a designated time. Radio head interface module 106 would hop to the new RF frequency on the transmission of the trigger data sample.

In operation, when a subscriber unit 102 emits a transmission signal within the designated coverage area, a radio head unit 104 through one or more antennas 160, picks up the signal. Subscriber unit 102 as used in this application includes but is not limited to cellular telephones, pagers, personal digital assistant, wireless modems, and other wireless terminals. Subscriber unit 102 may be a hand held device, a mobile station or a fixed station such as in a wireless local loop system.

Radio head unit 104 communicates with one or more subscriber units 102 in a particular coverage area over an RF link provided by radio head unit 104's associated antenna 160. Radio head unit 104 communicates received signals to BTS 110 for routing to one or more communication networks 120. In one embodiment, radio head unit 104 consists fundamentally of an antenna, duplexer, multicarrier power amplifier and low-noise amplifier (i.e. the radio "front end".) In one embodiment, radio head unit 104 is responsible for receiving the RF uplink signal from subscriber units 102, digitizing the RF signal and converting the digitized RF signal to a digital representation signal for transmission as a data stream over transport mediums 112.

In one embodiment, call processing software module 114 generates representations of voice/data signals from communications network 120 into data streams that are transported to radio head unit 104 via transport mediums 111. In one embodiment, call processing software module 114 generates digital representations of voice/data signals. In one embodiment, other base station implementations including modulation/demodulation of digitized RF signals, encoding/decoding of data signals, and BSC 118 interfaces are performed by BTS 110. BTS 110 includes transmitters and receivers that enable subscriber units 102 to communicate with one or more communication networks. In one embodiment, BTS 110 also links subscriber unit 102 to other subscriber units that are communicating with other remote devices or base station systems.

Radio head interface module 106, radio head unit 104, and call processing software module 114, all handle multiple types of modulation protocols, and in different embodiments, one or more of the logical channels transmit data using a different modulation protocol than another logical channel. In one embodiment, radio head interface module 106, radio head unit 104, and call processing software module 114, handle modulation protocols for one or more of, but not limited to, Advanced Mobile Phone System (AMPS), code division multiple access (CDMA), Wide-band CDMA (WCDMA), time division multiple access (TDMA), Global System for Mobile communications (GSM), Cellular Digital Packet Data (CDPD), Enhanced Data rates for GSM Evolution (EDGE), General Packet Radio Service (GPRS), Integrated Digital Enhanced Network (iDEN), Orthogonal Frequency Division Multiplexing (OFDM), or any other appropriate modulation protocol. A modulation protocol is commonly also referred to as an air interface standard, a modulation standard, an air interface protocol, or an air interface modulation protocol. Some of these modulation protocols, such as GSM, support frequency hopping, while others do not. Accordingly, radio head interface card 104 enables frequency hopping on a logical channel carrying data for a modulation protocol supporting frequency hopping, and disables frequency hopping on a logical channel carrying data for a modulation protocol that does not support frequency hopping. For each logical channel, call processing software module 114 performs modulation and demodulation of forward and reverse logical channel voice data streams using one or more of the air interface standard protocols. In one embodiment, the forward and reverse logical channel data streams carry complex RF data samples representing voice and data communications.

In one embodiment, BTS 110, in the forward link, is responsible for modulating received voice and/or data signals and generating a digital representation of the voice/data signals for transmission to one more subscriber units 102. In one embodiment, in the forward link, remote unit 104 also converts digital representations of voice/data signals to digital signals and converts the digital signals to RF signals for transmission to subscriber unit 102. In the reverse link, server 110 performs functions associated with a base station transceiver including base station controller operations, modulation of the voice and data transmissions.

In one embodiment, BTS 110 is a general purpose computer that includes one or more radio head interface modules 106 coupled to communicate with one or more remote units 104 in the forward and reverse paths. In one embodiment, server 110 is an HP Proliant Server. In one embodiment, radio head interface module 106 is coupled to BTS 110 through an interface device 116. In one embodiment, interface device 116 is one of, but not limited to a PCI-X interface, an ATCA interface, a PCI Express interface, a Gigabit Ethernet interface, a SCSI interface, a Rocket I/O interface, a UDP/IP link interface, a TCP/IP link interface, a Serial ATA interface, a Card bus for PCMIA card interface, a high speed serial interface or a high speed parallel interface. In another embodiment, radio head interface module 106 functions may be integrated directly into BTS 110 rather than reside on a separate expansion card. In still another embodiment, radio head unit 104 and radio head interface module 106 can be combined into a single card. In other embodiments, BTS 110 may be adapted with multiple radio head interface modules (such as radio head interface module 106), increasing the number of logical channels supported by BTS 110.

In operation, call processing software module 114 includes algorithms to support FCC channel hopping and in one embodiment, includes algorithms to support FCC channel hopping as designated in GSM standard 3GPP TS 05.02. Radio head interface module 106, which translates baseband modulation signals up and down in frequency, is adapted to interface with call processing software module 114 and implements frequency channel hopping based on information received via call processing software module 114. Both radio head interface module 106 and subscriber unit 102 need to hop to the same frequencies at the same time to communicate over the RF channel.

Figure 1B:
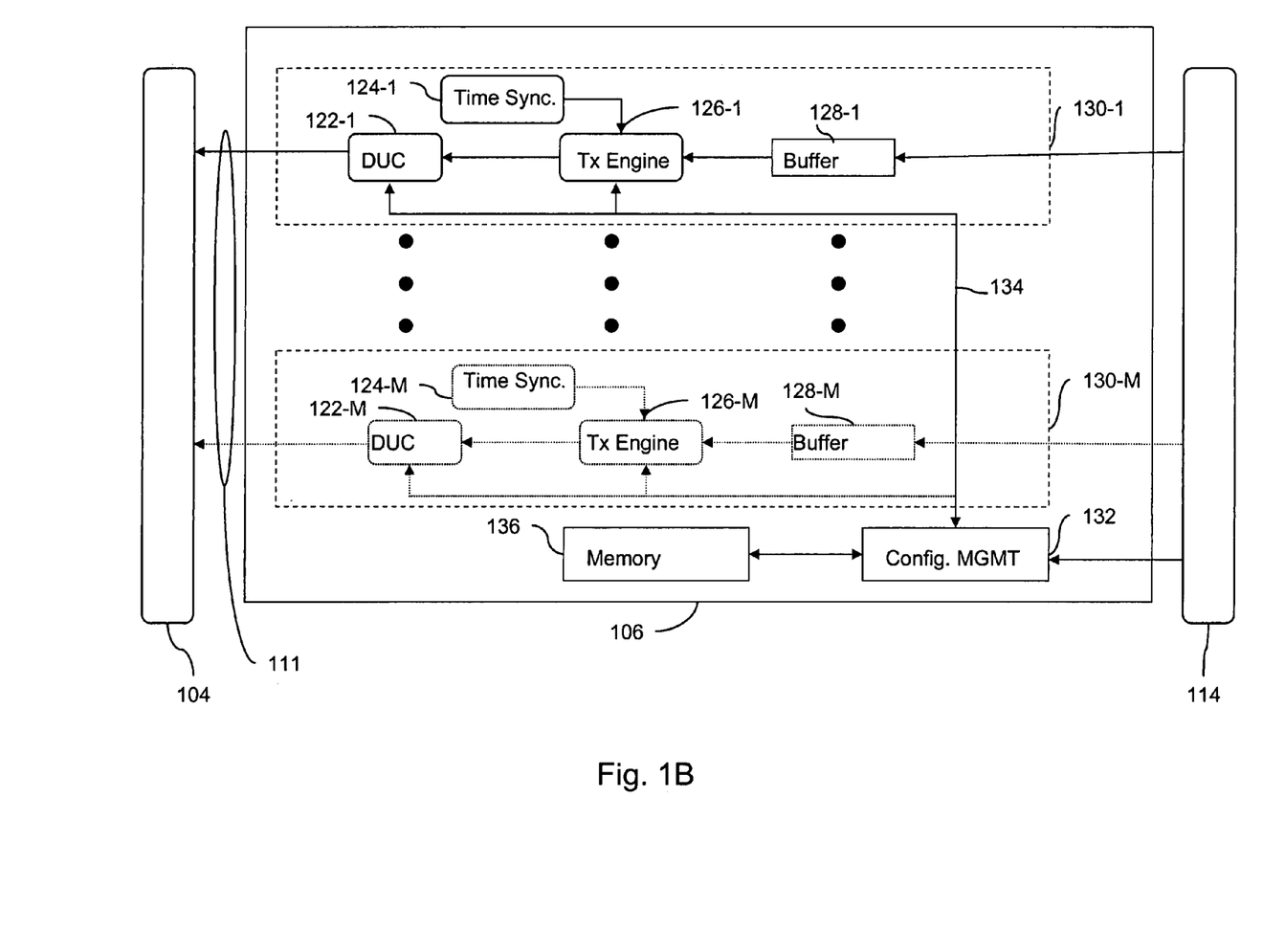

FIG. 1B illustrates one embodiment of a forward logical channel 130-1 data path. A radio head interface module forward logical channel comprises a transmit buffer 128-1, a transmit engine 126-1, a digital up converter (DUC) 122-1 and a time synchronizer 124-1. In operation, in one embodiment, transmit buffer 128-1 receives a page of complex RF data samples from call processing software 114. Transmit engine 126-1 removes the page of complex RF data samples from the transmit buffer 128-1 and sends the data samples to DUC 122-1. In one embodiment, transmit engine 126-1 holds the page of complex RF data samples until time synchronizer 124-1 determines that the current time matches a start time code embedded within the page. When the two times match, transmit engine 126-1 starts transmitting the page of complex data samples to DUC 122-1.

In one embodiment, call processing software 114 modulates representations of voice/data signals for forward logical channel 130-1 to an intermediate (i.e. baseband) frequency to produce a page of a first set of complex RF data samples. DUC 122-1 converts the page of the first set of complex RF data samples from the baseband frequency used by call processing software 114 into a digital stream of representations of voice/data signals modulated at a center frequency designated for the RF channel assigned to logical channel 130-1, and outputs the digital stream as a second set of complex RF data samples to radio head unit 104. In one embodiment, the first set of complex RF data samples are 16 bit data samples. In one embodiment, the second set of complex RF data samples are 14 bit data samples. Embodiments of the present invention provide for dynamic frequency hopping of the signal broadcasted by radio head unit 104 by reconfiguring DUC 122-1 with parameters that either increase of decrease the center frequency of the complex RF data samples sent by DUC 122-1 to radio head unit 104. Increasing the center frequency of complex RF data samples results in transmitting an RF signal at a higher radio frequency while decreasing the center frequency of complex RF data samples results in transmitting an RF signal at a lower radio frequency. In one embodiment, radio head interface module 106 comprises a plurality of M forward logical channels 130-1 through 130-M each having transmit buffers 128-1 through 126-M, transmit engines 126-1 through 126-M, DUCs 122-1 through 122-M and time synchronizers 124-1 through 124-M, each operating as described herein. Additional details regarding the configuration and operation of DUCs and DUC parameters are discussed in the '673 and '677 applications, incorporated herein by reference.

In one embodiment, radio head interface module 106 receives frequency hopping instructions for forward logical channel 130-1 from call processing software module 114. In operation, in one embodiment, configuration management unit 132 receives information from call processing software module 114 to adjust the signal power level of logical channel 130-1. Configuration management unit 132 looks up associated DUC parameters for the desired frequency from a table located in memory 136. Through control channel 134, configuration management unit 132 loads appropriate coefficients to DUC 122-1. In one embodiment, DUC 122-1 is adapted with a buffer memory which holds the parameters received from configuration management unit 132. In one embodiment, transmit engine 126-1 sends a synchronization signal to DUC 122-1 to load the parameters from buffer memory into DUC 122-1's active registers. Once the parameters are loaded into the active registers, logical channel 130-1 adjusts the center frequency of the complex RF data samples supplied to radio head unit 104 as specified by call processing software module 114.

Figure 1C:
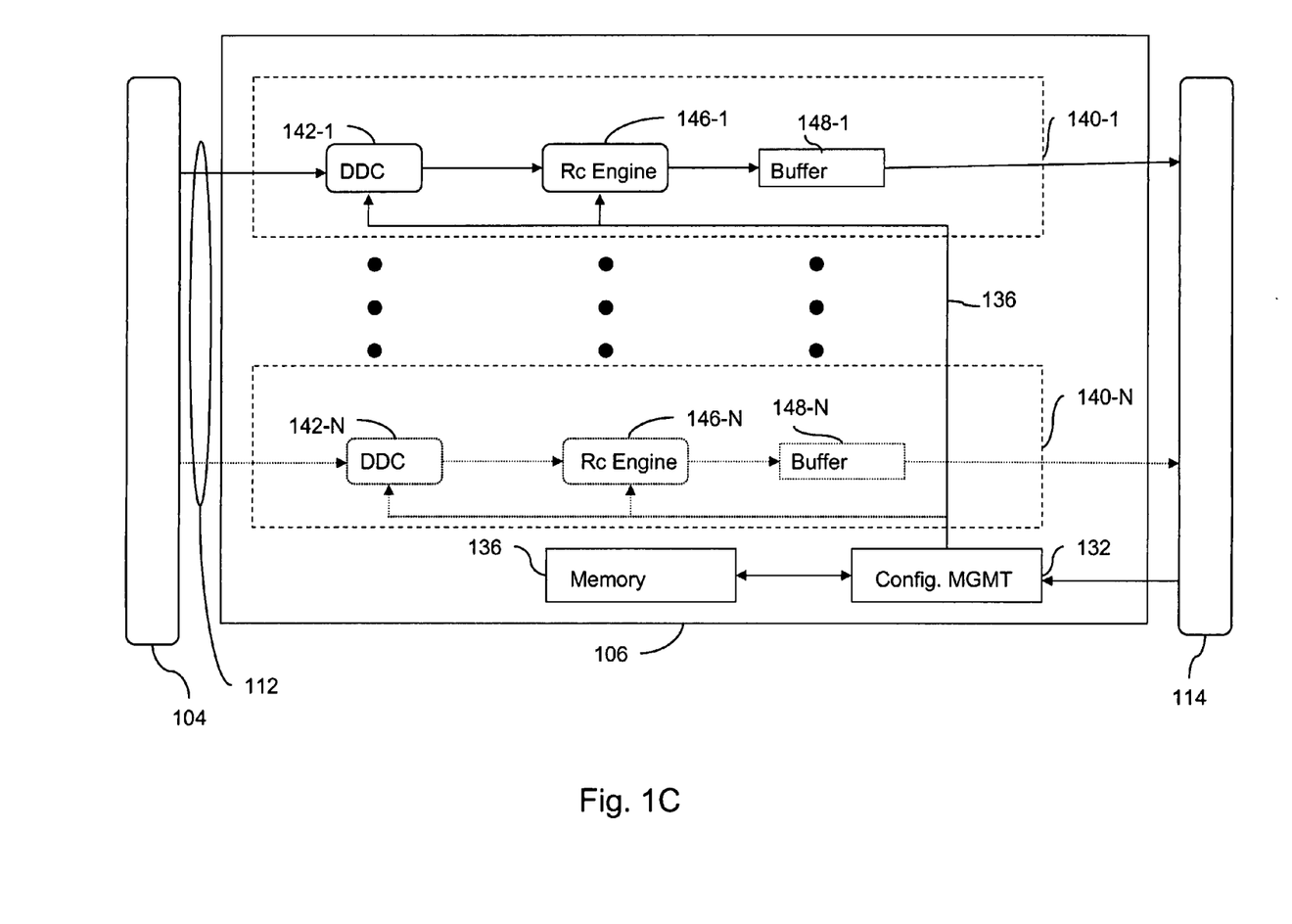

In one embodiment, radio head interface module 106 receives frequency hopping instructions for reverse logical channel 140-1 from call processing software module 114. In FIG. 1C, one embodiment of the present invention for a reverse logical channel 140-1 data path is illustrated. A radio head interface module 106 reverse logical channel 140-1 comprises a receiver buffer 148-1, a receive engine 146-1, and a digital down converter (DDC) 142-1. In one embodiment, radio head interface module 106 comprises a plurality of N reverse logical channels 140-1 through 140-N each having receiver buffers 148-1 through 148-N, receive engines 146-1 through 146-N and DDCs 142-1 through 142-N. In operation, in one embodiment, subscriber unit 102 modulates representations of voice/data signals into a digital stream of representations of voice/data signals modulated at a center frequency designated for the RF channel assigned to reverse logical channel 140-1. DDC 142-1 converts the digital stream into complex RF data samples modulated at an intermediate (or baseband) frequency used by call processing software 114. Receive engine 146-1 receives the complex RF data samples from DDC 142-1 and places them into a receiver buffer 148-1. As receiver buffer 148-1 fills, it creates a page of a fourth set of complex RF data samples. In one embodiment, the thirds set of complex RF data samples are 14 bit samples. In one embodiment, the fourth set of complex RF data samples are 16 bit samples. The completed page is subsequently received and processed by call processing software module 114.

Embodiments of the present invention provide for dynamic frequency hopping in the reverse link by reconfiguring DDC 142-1 with parameters that convert the center frequency of the complex RF data samples received by DDC 142-1 from radio head unit 104. Additional details pertaining to DDC parameters are provided in the '673 application incorporated herein by reference. In operation, in one embodiment, configuration management unit 132 receives information from call processing software module 114 to hop to a new RF frequency for reverse logical channel 140-1. This new RF frequency will match the RF frequency used by subscriber unit 102 to transmit voice and data signals to radio head 104. In one embodiment, the new RF frequency is the frequency dictated by the modulation protocol assigned to logical channel 140-1. Configuration management unit 132 looks up the associated parameters for the desired signal gain from the table located in memory unit 136. Through control channel 134 configuration management unit 132 loads the appropriate coefficients to DDC 142-1. In one embodiment, DDC 142-1 is adapted with a buffer memory that holds the parameters received from configuration management unit 132. In one embodiment, an associate forward logical channel 130-1's transmit engine 126-1 sends a synchronization signal to DDC 142-1 to load the parameters from the buffer memory into DDC 142-1's active registers. Once the parameters are loaded into the active registers, logical channel 140-1 amplifies reverse link data samples based on the signal gain specified by call processing software module 114. Once the parameters are loaded into the active registers, logical channel 140-1 adjusts the center frequency of the complex RF data samples received from radio head unit 104 to the baseband frequency expected by call processing software module 114. In one embodiment, reverse logical channel 140-1 is a diversity logical channel.

In operation, in one embodiment, each time call processing software 114 initiates frequency hopping for one or more logical channels, call processing software module 114 provides information to radio head interface module 106 so that RF channel hopping of the mobile device 102 and RF channel hopping of radio head interface module 106 are in lock step and so that communications data is not corrupted or lost.

In one embodiment, in support of the GSM protocol, information provided by call processing software module 114 to radio head interface module 106 includes two pieces of information: the RF channel to hop to, and a designated time to make the hop. Radio head interface module 106 will receive the information and hop to the particular RF channel at the designated time identified by call processing software 114. The designated time is based on radio head interface module 106's internal time count. In one embodiment, radio head interface module 106 is further adapted with a global positioning system (GPS) receiver 117 to control the internal time count of radio head interface and further synchronize server 110 and call processing software module 114 clocks with radio head interface module 106. In one embodiment, GPS receiver 117 outputs a one pulse per second signal, and a 10 MHz signal to radio interface module 106.

In another embodiment, in support of the GSM protocol, information provided by call processing software module 114 to radio head interface module 106 includes an RF channel to hop to and a trigger data sample that designates when to perform the frequency hop, instead of a designated time to perform the hop. In operation, radio head interface module 106 hops to the new RF frequency on the transmission of the trigger data sample.

Call processing software module 114 directly informs radio head interface module 106 of the RF channel to use for a logical channel, along with the time to hop to the RF channel, dynamically each time call processing software module 114 determines the need to hop. As a result, there is no need for call processing software module 114 to send radio head interface module 106 the GSM frequency hopping algorithms and corresponding tables in order for the card to perform the frequency channel hop. Embodiments of the present invention eliminate the need to implement tables provided by call processing software module 114. There is no need to create and maintain corresponding tables for the base station and the radio head interface card.

In one embodiment, communication system 100 further includes a management PC 115 that controls the behavior of radio interface module 106 through element management system (EMS) module 108 and in some embodiments, a simple network management protocol (SNMP) agent 109. In one embodiment, EMS module 108 is located within BTS 110. During initial configuration of communication system 100, EMS module 108 is used to instruct radio head interface module 106 whether to enable or disable frequency hopping for a specific logical channel depending on the modulation protocol that will be used with that specific logical channel. Further, the EMS module 108 is adapted to know the modulation protocols and the valid ranges of RF channels supported by the specific hardware used to realize radio head unit 104. In one embodiment, the valid RF channels for the specific radio head unit 104 are provided to radio head interface module 106.

In one embodiment, during initial configuration of communication system 100, DUC and DDC parameters, are loaded into radio head interface module 106 for one or more of the protocols supported by radio head unit 104. Such parameters include, but are not limited to, DUC and DDC filter parameters and sampling rates necessary to support valid RF channels, sampling rates, signal gains, and modulation protocol configurations. Additional details regarding the configuration and operation of DUCs and DDCs are discussed in the '673 application, incorporated herein by reference. In one embodiment, the parameters are stored in a table in memory 136 in radio head interface module 106.

In some embodiments, when call processing software module 114 instructs radio head interface module 106 to hop to an RF channel outside of the valid channels supported by radio head unit 104, radio head interface module 106 generates an error condition flag. Further, in some embodiments, when call processing software module 114 instructs radio head interface module 106 to frequency hop at an invalid designated time, radio head interface module 106 generates an error condition flag. Still further, in some embodiments, when call processing software module 114 instructs radio head interface module 106 to frequency hop a logical channel whose modulation protocol does not support frequency hopping (i.e. a logical channel whose frequency hopping was disabled by the EMS module 108), radio head interface module 106 generates an error condition flag and the frequency hop request is ignored by radio head interface module 106. In one embodiment, EMS module 108 is accessed remotely by SNMP management module 170 through SNMP agent 109. Further details about management module 170 and agent 109 are provided in the '677 application and '700 application both herein incorporated by reference.

In one embodiment, the frequency hopping information is specified per logical channel as new information in a page header generated by call processing software module 114. In one embodiment, call processing software module 114 generates a page header which contains information including, but not limited to, a frequency hopping flag (indicating that frequency hopping instructions are contained within the header), an RF channel (indicating the RF channel assignment to begin using upon the next frequency hop), and frequency hopping trigger information (indicating when the logical channel should hop to the new RF channel). In one embodiment, the frequency hopping trigger is a designated time. In another embodiment, the frequency hopping trigger is a trigger data sample that instructs radio head interface module 106 to hop to the new RF channel upon receipt of the trigger data sample.

To support channel hopping in both the forward and reverse logical channels, embodiments of the present invention also include frequency hopping instructions in the page header for one or more reverse logical channels. In one embodiment, the page header includes an RF channel indicating the RF channel assignment for the reverse logical channel upon the next frequency hop. In one embodiment, the page header includes frequency hopping trigger information for the reverse channel. In some embodiments, the page header includes both an RF channel for the forward logical channel to hop to, and an RF channel for an associated reverse logical channel to hop to.

In some applications it is not desirable to perform a frequency hop on both the forward and reverse logical channels simultaneously because of hardware or signal propagation delays. Therefore, in one embodiment, the reverse logical channel hops to the new reverse RF channel a specified time after the forward channel hops to the new forward RF channel. In one embodiment, radio head interface module 106 determines an appropriate time delay for hopping the reverse channel. In one embodiment, the duration of the time delay for hopping the reverse logical channel is included in the page header. Additional details concerning the communication of frequency hopping information through page headers are provided in the '675 application herein incorporated by reference.

Figure 2:
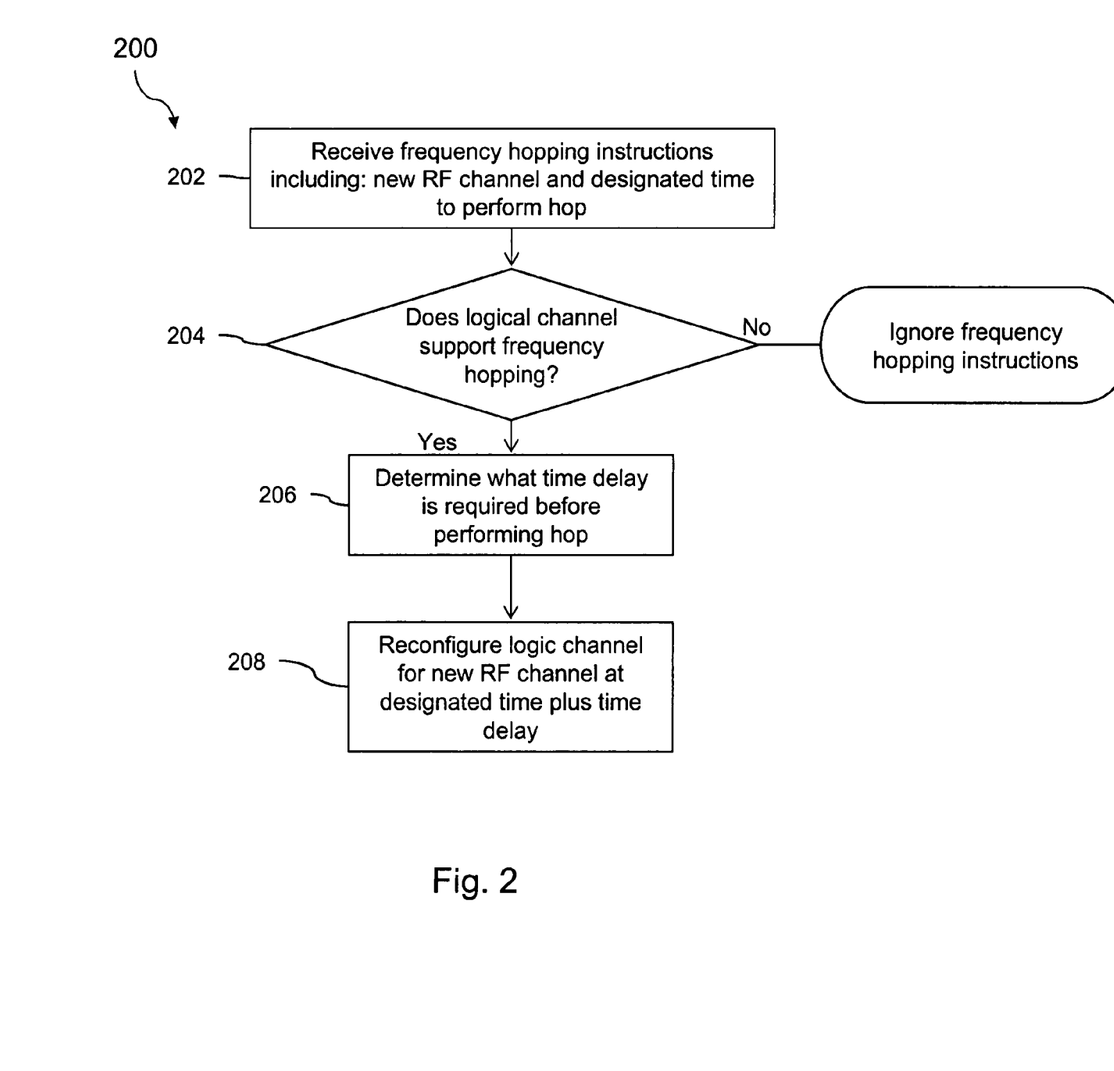
FIG. 2 is a flow chart of dynamic frequency hopping of one embodiment of the present invention.

FIG. 2 is a flow chart of one embodiment of dynamic frequency hopping in a reverse link, shown generally at 200. At step 202, a radio head interface receives frequency hopping instructions from call processing software indicating a RF channel to hop to and a designated time to perform frequency hoping for a logical channel, as discussed above with respect to FIG. 1. At step 204, the radio head interface checks the configuration of the logical channel to determine if the channel is configured for a modulation protocol that supports frequency hopping. If the logical channel supports frequency hopping, the method proceeds to 206 and the radio interface card determines what if any time delays are necessary before performing the frequency hop. Proceeding to step 208, at the designated time plus the necessary time delays, the logical channel changes to the RF channel indicated by the processing software. If at step 204, radio head interface determines that the logical channel does not support frequency hopping, the method terminates and does not perform a logical channel frequency hop.

Figure 3:
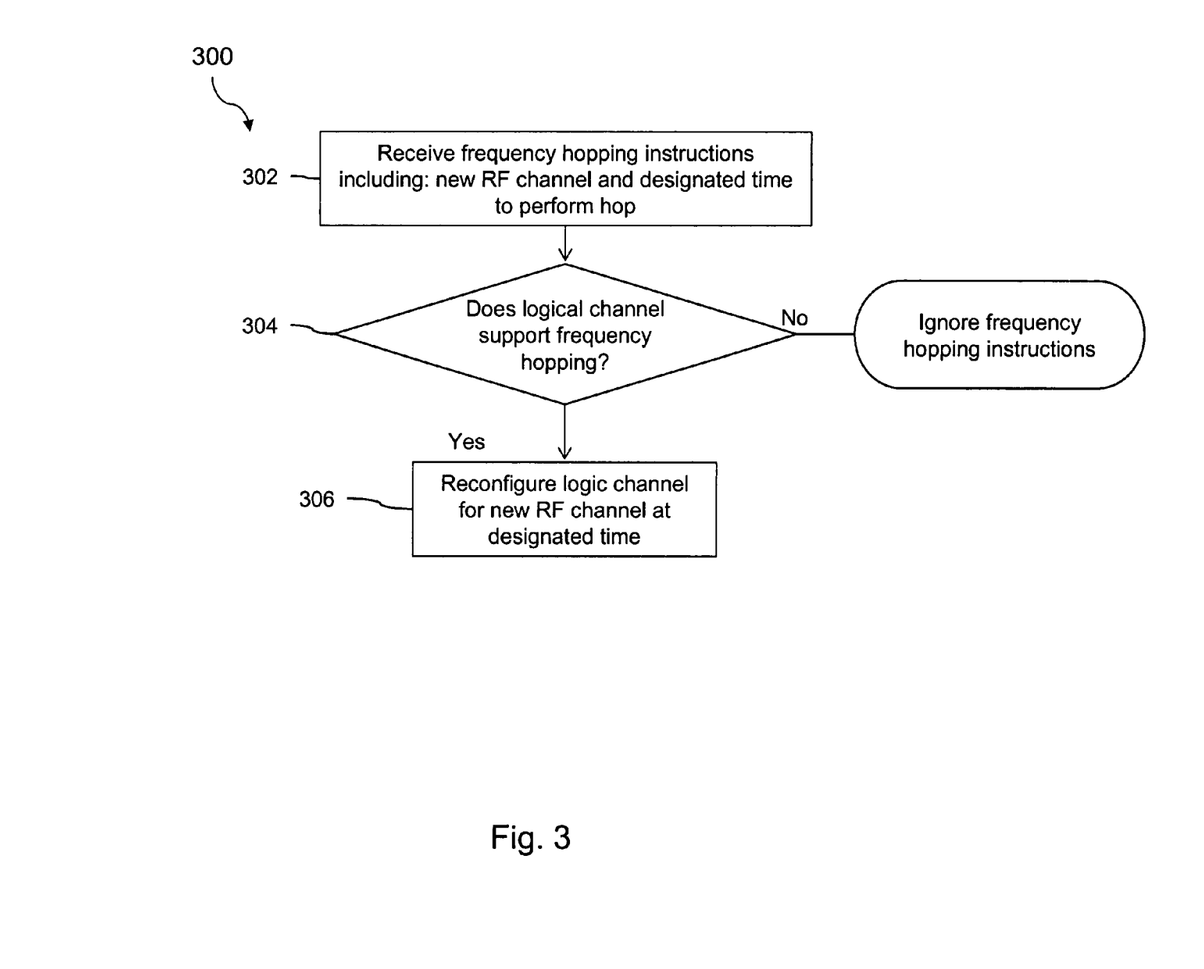
FIG. 3 is another flow chart of dynamic frequency hopping of one embodiment of the present invention.

FIG. 3 is a flow chart of one embodiment of dynamic frequency hopping in a forward link, shown generally at 300. At step 302, a radio head interface receives frequency hopping instructions from the processing software indicating a RF channel to hop to and a designated time to perform frequency hopping for a logical channel, as discussed above with respect to FIG. 1. At step 304, the radio head interface checks the configuration of the logical channel to determine if the channel is configured for a modulation protocol that supports frequency hopping. If the logical channel supports frequency hopping, the method proceeds to step 306. Proceeding to step 306, at the designated time, the logical channel changes to the RF channel indicated by the processing software. If at step 304, radio head interface determines that the logical channel does not support frequency hopping, the method terminates and does not perform a logical channel frequency hop.

Figure 4:
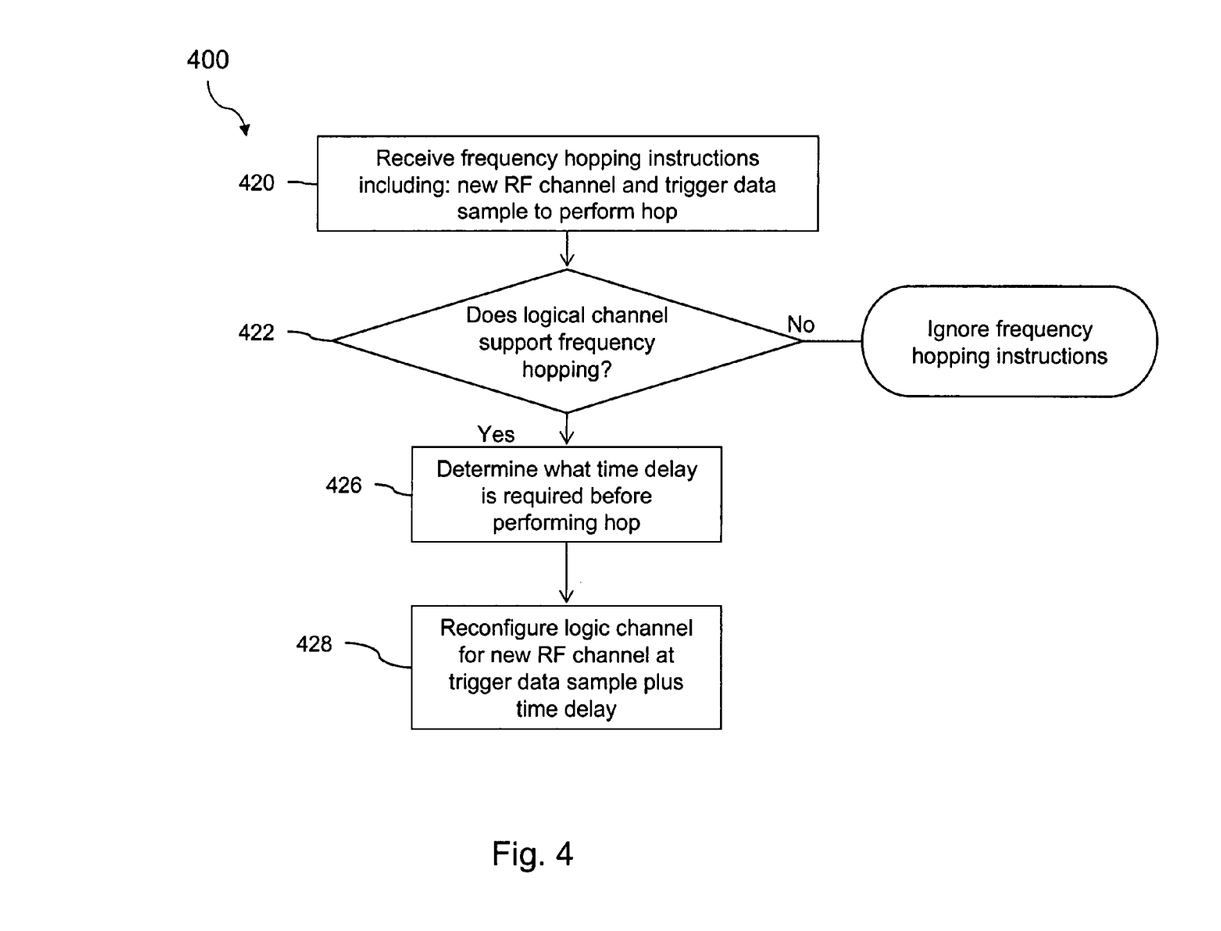
FIG. 4 is a flow chart of dynamic frequency hopping of an alternate embodiment of the present invention.

FIG. 4 is a flow chart of one embodiment of dynamic frequency hopping in a reverse link, shown generally at 400. At step 420, a radio head interface receives frequency hopping instructions from call processing software indicating a RF channel to hop to and information identifying a data sample to trigger frequency hopping, for a logical channel as discussed above with respect to FIG. 1. At step 422, the radio head interface checks the configuration of the logical channel to determine if the channel is configured for a modulation protocol that supports frequency hopping. If the logical channel supports frequency hopping, the method proceeds to 424 and the radio interface card determines what if any time delays are necessary before performing the frequency hop. Proceeding to step 426, when the identified data sample is received plus the necessary time delays, the logical channel changes to the RF channel indicated by the processing software. If at step 422, radio head interface determines that the logical channel does not support frequency hopping, the method terminates and does not perform a logical channel frequency hop.

Figure 5:
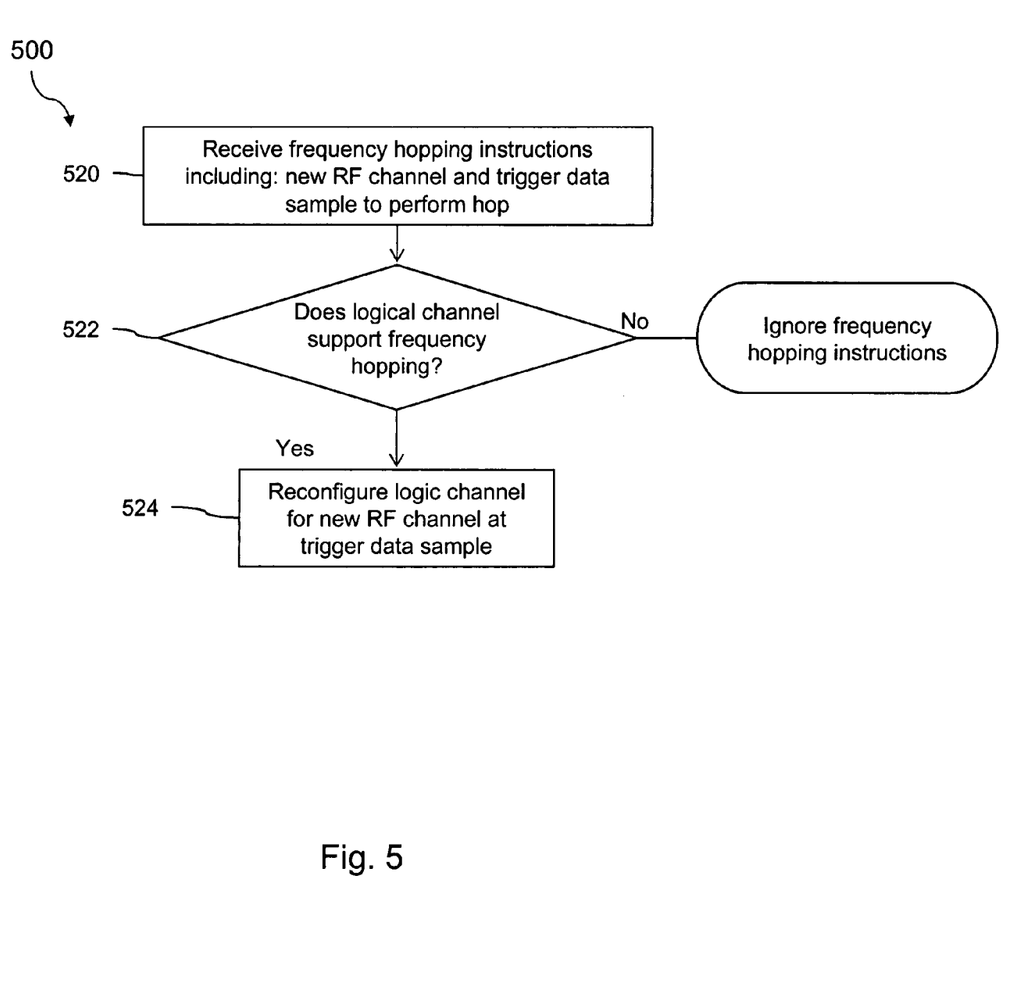
FIG. 5 is another flow chart of dynamic frequency hopping of an alternate embodiment of the present invention.

FIG. 5 is a flow chart of one embodiment of dynamic frequency hopping in a forward link, shown generally at 500. At step 520, a radio head interface receives frequency hopping instructions from call processing software indicating a RF channel to hop to and information identifying a data sample to trigger frequency hopping, for a logical channel as discussed above with respect to FIG. 1. At step 522, the radio head interface checks the configuration of the logical channel to determine if the channel is configured for a modulation protocol that supports frequency hopping. If the logical channel supports frequency hopping, the method proceeds to 524. Proceeding to step 524, when the identified data sample is received plus the necessary time delays, the logical channel changes to the RF channel indicated by the processing software. If at step 522, radio head interface determines that the logical channel does not support frequency hopping, the method terminates and does not perform a logical channel frequency hop.

What is claimed is:

1. A communications system, comprising:
    a server, including:
        one or more radio head interface modules; and
        a call processing software module, the one or more radio head interface modules adapted to communicate with the call processing software module;
        wherein the call processing software module performs modulation and demodulation of voice and data streams using one or more air interface standards; and
    a radio head unit coupled to the radio head interface module over one or more transport mediums;
    wherein the radio head unit communicates with one or more subscriber units using the one or more air interface standards;
    wherein the radio head interface module receives frequency channel hopping information from the call processing software module for a plurality of communication channels;
    wherein the frequency channel hopping information comprises a channel and a time to hop trigger for one or more of the plurality of communication channels;
    wherein the time to hop trigger is a designated time;
    wherein the designated time correlates to a time count internal to the radio head interface module.

2. The system of claim 1, wherein the server further comprises:

one or more interface devices, wherein the one or more radio head interface modules communicate with the call processing software module over the one or more interface devices.

3. The system of claim 2, wherein one or more interface devices includes at least one of a PCI-X interface, a ATCA interface, a PCI Express interface, a Gigabit Ethernet interface, a SCSI interface, a Rocket I/O interface, a UDP/IP link interface, a TCP/IP link interface, a Serial ATA interface, a Card bus for PCMIA cards interface, a high speed serial interface and a high speed parallel interface.

4. The system of claim 1, wherein one or more air interface protocols include at least one of Global System for Mobile communications (GSM), Advanced Mobile Phone System (AMPS), code division multiple access (CDMA), Wide-band CDMA, time division multiple access (TDMA), Cellular Digital Packet Data (CDPD), Enhanced Data rates for GSM Evolution (EDGE), General Packet Radio Service (GPRS), Integrated Digital Enhanced Network (iDEN), and Orthogonal Frequency Division Multiplexing (OFDM).

5. The system of claim 1, wherein the call processing software module communicates one or more pages of data samples with the one or more radio head interface modules, each of the one or more pages of data samples having a page header; and
wherein frequency channel hopping information is contained in the page header.

6. The system of claim 1, wherein radio head interface module further comprises:
a global positioning system receiver, wherein the time count internal to the radio head interface module is synchronized with an output signal from the global positioning system receiver.

7. The system of claim 6, wherein the call processing software is synchronized with an output signal from the global positioning system receiver.

8. The system of claim 1, wherein the time to hop trigger is a designated data sample.

9. The system of claim 1, wherein the transport mediums are one or more of twisted pair cable, optical fiber, millimeter wave, coaxial cable, and Free Space Optics (FSO).

10. A communications system, comprising:
a server, including:
one or more radio head interface modules; and
a call processing software module, the one or more radio head interface modules adapted to communicate with the call processing software module;
wherein the call processing software module performs modulation and demodulation of voice and data streams using one or more air interface standards; and
a radio head unit coupled to the radio head interface module over one or more transport mediums;
wherein the radio head unit communicates with one or more subscriber units using the one or more air interface standards;
wherein the radio head interface module receives frequency channel hopping information from the call processing software module for a plurality of communication channels;
wherein the frequency channel hopping information comprises a channel and a time to hop trigger for one or more of the plurality of communication channels;
wherein the radio head interface module further comprises:
a transmit buffer, the transmit buffer adapted to receive a data stream from the call processing software module and store the data stream as a page of data samples;
a transmit engine;
a digital upconverter, wherein the transmit engine is adapted to transfer the page of data samples from the transmit buffer to the digital upconverter;
a configuration management unit adapted to receive frequency channel hopping information from the call processing software module; and
a memory adapted with digital upconverter parameters;
wherein the configuration management unit is further adapted to access the memory to lookup digital upconverter parameters based on the frequency channel hopping information;
wherein the configuration management unit is further adapted to output the digital upconverter parameters to the digital upconverter.

11. The system of claim 10, wherein the radio head interface module farther comprises:
a receive buffer;
a receive engine; and
a digital downconverter;
the receive engine adapted to transfer a data stream from the digital downconverter to the receive buffer, the receive buffer adapted to store the data stream as a page of data samples, the receive buffer further adapted to output the page of data samples to the call processing software module;
the memory further adapted with digital downconverter parameters;
wherein the configuration management unit is further adapted to access the memory to lookup digital downconverter parameters based on the frequency channel hopping information;
wherein the configuration management unit is further adapted to output the digital downconverter parameters to the digital downconverter.

12. The system of claim 11, wherein the time to hop trigger is a designated time.

13. The system of claim 12, wherein the designated time correlates to a time count internal to the radio head interface module.

14. The system of claim 13, wherein radio head interface module further comprises:
a global positioning system receiver, wherein the time count internal to the radio head interface module is synchronized with an output signal from the global positioning system receiver.

15. The system of claim 14, wherein the call processing software is synchronized with an output signal from the global positioning system receiver.

* * * * *

UNITED STATES PATENT AND TRADEMARK OFFICE
CERTIFICATE OF CORRECTION

PATENT NO. : 7,593,450 B2  Page 1 of 1
APPLICATION NO. : 11/095788
DATED : September 22, 2009
INVENTOR(S) : Conyers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1020 days.

Signed and Sealed this

Fourteenth Day of December, 2010

David J. Kappos
*Director of the United States Patent and Trademark Office*